(12) United States Patent
Schlepple et al.

(10) Patent No.: US 11,555,972 B2
(45) Date of Patent: Jan. 17, 2023

(54) CONNECTING OPTICAL CONNECTOR WITH CO-PACKAGED OPTICAL DEVICE

(71) Applicant: Cisco Technology, Inc., San Jose, CA (US)

(72) Inventors: Norbert Schlepple, Macungie, PA (US); Vipulkumar K. Patel, Breinigsville, PA (US); Anthony D. Kopinetz, York, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/303,853

(22) Filed: Jun. 9, 2021

(65) Prior Publication Data

US 2022/0397727 A1    Dec. 15, 2022

(51) Int. Cl.
  G02B 6/42    (2006.01)

(52) U.S. Cl.
  CPC ........... *G02B 6/423* (2013.01); *G02B 6/4206* (2013.01); *G02B 6/4212* (2013.01); *G02B 6/4239* (2013.01)

(58) Field of Classification Search
  None
  See application file for complete search history.

(56) References Cited

U.S. PATENT DOCUMENTS

| | | | | |
|---|---|---|---|---|
| 6,724,015 B2* | 4/2004 | Nelson | ................ | G02B 6/4212 438/26 |
| 7,165,895 B2* | 1/2007 | Wickman | ............ | G02B 6/4206 385/39 |
| 8,803,269 B2* | 8/2014 | Shastri | .................... | G02B 6/426 257/E21.597 |
| 8,805,129 B2* | 8/2014 | Han | ........................ | G02B 6/423 385/129 |
| 9,268,106 B2* | 2/2016 | Lee | ...................... | G02B 6/3838 |
| 9,435,965 B2* | 9/2016 | Togami | ................ | G02B 6/4244 |
| 9,588,307 B2* | 3/2017 | Engel | .................... | G02B 6/4277 |
| 9,921,378 B2* | 3/2018 | Pfnuer | ................. | G02B 6/4231 |
| 10,459,179 B2* | 10/2019 | Lin | ........................ | G02B 6/4244 |
| 2002/0172472 A1* | 11/2002 | Nelson | ................. | G02B 6/4212 385/39 |
| 2004/0067029 A1* | 4/2004 | Wickman | ................ | G02B 6/425 385/39 |
| 2011/0085760 A1* | 4/2011 | Han | ........................ | G02B 6/423 385/14 |

(Continued)

*Primary Examiner* — Jerry Rahll
(74) *Attorney, Agent, or Firm* — Patterson + Sheridan, LLP (57) ABSTRACT

Aspects described herein include an apparatus supporting optical alignment with one or more optical waveguides optically exposed along an edge of a photonic integrated circuit (IC). The apparatus comprises a frame body comprising an upper portion defining a reference surface, and a lateral portion defining an interface for an optical connector connected with one or more optical fibers. The lateral portion comprises one or more optical components defining an optical path through the lateral portion. The one or more optical components are arranged relative to the reference surface such that the one or more optical components align with (i) the one or more optical waveguides along at least one dimension when the reference surface contacts a top surface of an anchor IC, and with (ii) the one or more optical fibers when the optical connector is connected at the interface.

20 Claims, 6 Drawing Sheets

(56) References Cited

U.S. PATENT DOCUMENTS

| | | | |
|---|---|---|---|
| 2012/0280344 A1* | 11/2012 | Shastri | G02B 6/4257 257/432 |
| 2013/0202255 A1* | 8/2013 | Togami | G02B 6/421 385/79 |
| 2014/0185995 A1* | 7/2014 | Lee | G02B 6/4231 156/293 |
| 2015/0370020 A1* | 12/2015 | Engel | G02B 6/4214 385/33 |
| 2016/0306118 A1* | 10/2016 | Pfnuer | G02B 6/421 |
| 2017/0205592 A1 | 7/2017 | Pfnuer | |
| 2017/0343738 A1 | 11/2017 | Kobyakov et al. | |
| 2018/0003906 A1 | 1/2018 | Kachru et al. | |
| 2018/0059330 A1 | 3/2018 | Evans | |
| 2019/0285804 A1 | 9/2019 | Ramachandran et al. | |
| 2022/0107475 A1* | 4/2022 | Nakayama | G02B 6/4231 |

\* cited by examiner

CONNECTING OPTICAL CONNECTOR WITH CO-PACKAGED OPTICAL DEVICE

TECHNICAL FIELD

Embodiments presented in this disclosure generally relate to optical engines (OE) for co-packaged optical (CPO) applications, and more specifically, to a frame device used to connect an optical connector with an OE device.

BACKGROUND

Fabrication of co-packaged optical (CPO) devices may be challenging as it typically requires an integration of diverse components and processes. For example, co-packaged optical devices may include one or more electronic integrated circuits (EICs) and one or more photonic integrated circuits (PIC), which may include digital signal processors, silicon photonics, and/or external optical connections (such as fiber array units arranging a plurality of optical fibers). Some examples of fabrication processes include package assembly, optical fiber attachment, and/or printed circuit board and socket assembly.

In optical transceivers, a fiber array unit (FAU) may be actively aligned and attached to a photonic integrated circuit using edge coupling or surface coupling. An optical connector is attached to a housing of the optical transceiver, and is optically connected with the FAU using short optical fibers (pigtails). In these implementations, the number of optical fibers may be limited by the FAU, and a mating force to the optical connector is typically absorbed by the housing and/or the cage on a front panel of the transceiver.

For CPO devices, however, there is typically no housing or cage to absorb the mating force to the optical connector. In addition, due to thermal, mechanical, and/or spatial constraints of the co-packaging, it may be preferable to integrate the FAU into a connector to eliminate the need for pigtails, which may reduce the number of optical connections in a link and thus an overall optical link loss.

In addition, CPO devices that are compatible with surface mount technology (SMT) reflow soldering may offer broad applicability to optical communications, high-performance computing, neural networks, high performance graphics, and automotive applications, and so forth.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is an apparatus supporting optical alignment with one or more optical waveguides optically exposed along an edge of a photonic integrated circuit (IC). The apparatus comprises a frame body comprising an upper portion defining a reference surface, and a lateral portion defining an interface for an optical connector connected with one or more optical fibers. The lateral portion comprises one or more optical components defining an optical path through the lateral portion. The one or more optical components are arranged relative to the reference surface such that the one or more optical components align with (i) the one or more optical waveguides along at least one dimension when the reference surface contacts a top surface of an anchor IC, and with (ii) the one or more optical fibers when the optical connector is connected at the interface.

One embodiment presented in this disclosure is a method of fabricating an optical apparatus. The method comprises optically aligning one or more optical components of a lateral interface of a frame body with one or more optical waveguides of a photonic integrated circuit (IC). The one or more optical waveguides are optically exposed along one or more lateral edges of the photonic IC. The frame body further comprises an upper portion defining a reference surface. Optically aligning the one or more optical components comprises contacting the reference surface with a top surface of an integrated circuit (IC). The method further comprises adhering the frame body to the IC, wherein adhering the frame body comprises applying an adhesive through one or more openings defined through the upper portion and extending to the top surface. The method further comprises connecting an optical connector to the frame body. One or more optical fibers are connected to the optical connector. Connecting the optical connector optically aligns the one or more optical fibers with the one or more optical waveguides through the lateral interface.

One embodiment presented in this disclosure is an optical apparatus comprising an anchor integrated circuit (IC), a photonic IC comprising one or more optical waveguides optically exposed along an edge of the photonic IC, and a frame. The frame comprises a lateral interface configured to receive an optical connector. One or more optical fibers attached to the optical connector are optically aligned with the one or more optical waveguides through the lateral interface. The frame further comprises an attachment interface configured to distribute a mating force of the optical connector across a top surface of the anchor IC.

EXAMPLE EMBODIMENTS

Embodiments of this disclosure are generally directed to an apparatus that supports optical alignment with one or more optical waveguides that are optically exposed along an edge of a PIC. The apparatus comprises a frame body comprising an upper portion defining a reference surface, and a lateral portion defining an interface for an optical connector connected with one or more optical fibers. The lateral portion comprises one or more optical components defining an optical path through the lateral portion. The one or more optical components are arranged relative to the reference surface such that the one or more optical components align with (i) the one or more optical waveguides along at least one dimension when the reference surface contacts a top surface of an anchor IC, and with (ii) the one or more optical fibers when the optical connector is connected at the interface.

In some embodiments, the frame body operates to anchor the optical connector to the anchor IC (which may be the photonic IC or another IC), to distribute the mating force of the optical connector across the top surface of the anchor IC, and/or to expose surface area of the anchor IC. Beneficially, connecting the optical connector with the frame body avoids challenges associated with directly connecting the optical connector to the photonic IC, such as excessive mating forces that can damage an end face of the photonic IC. For example, optical connectors that rely on physical fiber contact tend to accumulate excessive forces, e.g. about 2.5 N per fiber, that are absorbed by the photonic IC. Optical connectors that do not rely on physical contact (e.g., air gap, expanded beam) may still exert about 2.3 N in a mated state, although this amount may be independent of a fiber count.

Using the frame body may also increase an amount of surface area available for attaching additional component(s) to the anchor IC. Using the frame body may also be compatible with active alignment and/or precision vision-assisted alignment processes. Using the frame body may also support using different types of adhesives, which may be compatible with SMT reflow soldering processes.

Figure 1:
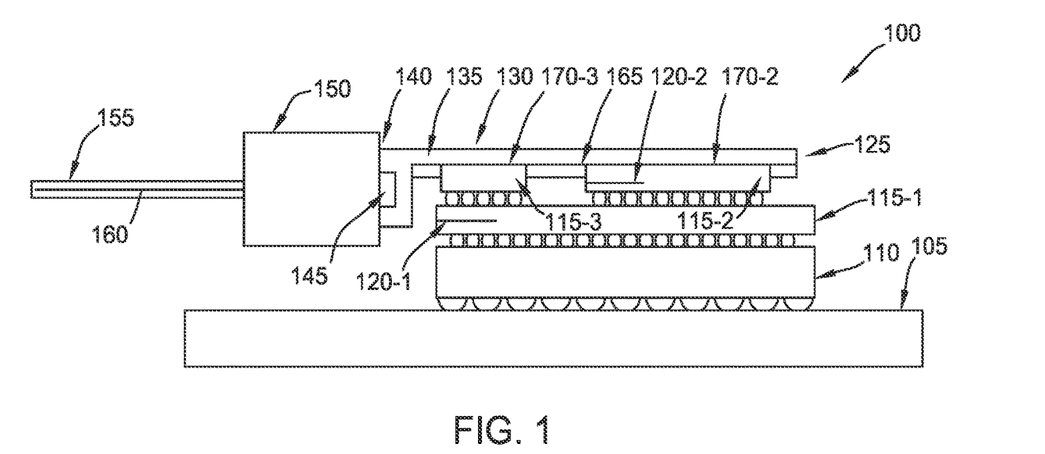
FIG. 1 is a cross-sectional view of a co-packaged optical system, according to one or more embodiments.

FIG. 1 is a cross-sectional view of an optical engine (OE) system 100. The OE system 100 may provide any suitable functionality, such as an optical transceiver. The OE system 100 sits on a printed circuit board (PCB) 105, and comprises of a substrate 110 conductively connected to the PCB 105, a lower IC 115-1 conductively connected to the substrate 110, and upper ICs 115-2, 115-3 conductively connected to the lower IC 115-1. In some embodiments, the substrate 110, the lower IC 115-1, and the upper ICs 115-2, 115-3 may be assembled into a subassembly (e.g., a standalone OE device) that is then mounted to the PCB 105. The conductive connections between the PCB 105, the substrate 110, the lower IC 115-1, and/or the upper ICs 115-2, 115-3 may be implemented in any suitable form, such as a ball grid array (BGA).

The lower IC 115-1 and the upper ICs 115-2, 115-3 may have any suitable functionality. In some embodiments, the lower IC 115-1 is a photonic IC comprising one or more optical waveguides 120-1 defined therein, and the upper IC 115-2 is an electronic IC. In some embodiments, the lower IC 115-1 is an electronic IC and the upper IC 115-2 is a photonic IC comprising one or more optical waveguides 120-2 defined therein. In some embodiments, the upper IC 115-3 is a dummy IC.

The one or more optical waveguides 120-1, 120-2 may be formed of any semiconductor material(s) suitable for propagating light, such as monocrystalline silicon, silicon nitride, polysilicon, and so forth. In some embodiments, the one or more optical waveguides 120-1, 120-2 are formed in a layer of a silicon-on-insulator (SOI)-based device. For example, the one or more optical waveguides 120-1, 120-2 may be formed in an active (silicon) layer of an SOI wafer, a silicon nitride layer deposited above the active layer, and so forth.

The one or more optical waveguides 120,1, 120-2 are optically exposed along one or more edges of the respective photonic IC. In some embodiments, the one or more edges comprise lateral edge(s) of the photonic IC. In some embodiments, the one or more edges comprise a top surface of the photonic IC. As used herein, "optically exposed" indicates that the one or more optical waveguides 120-1, 120-2 can optically couple with an external light-carrying medium, such as with an optical fiber 155 attached to an optical connector 150. "Optically exposed" encompasses implementations where the one or more optical waveguides 120-1, 120-2 are physically exposed at the one or more edges, or are slightly recessed from the one or more edges (e.g., 1-5 microns) but can nonetheless optically couple with the external light-carrying medium. "Optically exposed" also encompasses implementations having one or more intermediate optical components between the one or more optical waveguides 120-1, 120-2 and the external light-carrying medium, such as edge couplers and grating couplers. The intermediate optical component(s) may be physically exposed at the one or more edges, or slightly recessed from the one or more edges. In some embodiments, the intermediate optical component(s) comprise a multi-prong waveguide adapter as described in U.S. Pat. No. 9,274,275, entitled "Photonic integration platform", which is herein incorporated by reference.

The OE system 100 comprises a frame 125 that adheres to the upper IC 115-2 and/or the upper IC 115-3. In this way, the upper IC 115-2 and/or the upper IC 115-3 may operate as an anchor IC. The frame 125 comprises an upper portion 130 defining a reference surface 165, and a lateral portion 135 defining an interface 140 (also referred to as a lateral interface) for an optical connector 150. The frame 125 may be formed of any suitable material(s). In some embodiments, the upper portion 130 and the lateral portion 135 are integrally formed of a same material. For example, the frame 125 may be formed of optical resin. In other embodiments, the upper portion 130 and the lateral portion 135 are separately formed of the same material or different materials, and are joined together.

The optical connector 150 may be of any suitable type, whether standardized or proprietary. In some embodiments, the optical connector 150 attaches to one or more optical fibers 155, and arranges the corresponding optical core(s) 160 with a predefined arrangement. In some embodiments, the optical connector 150 comprises a FAU that arranges a plurality of optical fibers 155.

The frame 125 is dimensioned to arrange the optical connector 150 with a predetermined alignment at the interface 140. In some embodiments, the interface 140 of the lateral portion 135 and/or other portions of the frame 125 comprises alignment feature(s) that urge the optical connector 150 toward the predetermined alignment. In some embodiments, the frame 125 further comprises mechanical feature(s) that retain one or more latching features of the optical connector 150. In one example, the upper portion 130 comprises grooves that receive corresponding tabs of the optical connector.

The interface 140 of the lateral portion 135 includes one or more optical components 145 that align with the optical core(s) 160 when the optical connector 150 is connected to the frame 125. The one or more optical components 145 define an optical path through the lateral portion 135, and are arranged relative to the reference surface 165 such that the one or more optical components 145 align with (i) the one or more optical waveguides 120-1, 120-2 along at least one dimension when the reference surface 165 contacts the top surface 170-2, 170-3 of the anchor IC, and with (ii) the one or more optical fibers 155 when the optical connector 150 is connected at the interface 140. In some embodiments, the one or more optical components 145 comprise an array of collimator lenses. In some embodiments, the one or more optical components 145 comprise one or more mirrors. Some exemplary arrangements of the one or more optical components 145 are discussed in greater detail below with respect to FIGS. 3A-3D.

When the reference surface 165 contacts a top surface 170-2 of the upper IC 115-2 and/or a top surface 170-3 of the upper IC 115-3, the optical waveguide(s) 120-1, 120-2 are optically aligned with the one or more optical components 145 of the interface 140 along at least one dimension. In some embodiments, the frame 125 comprises one or more alignment features that contact the photonic IC, or the other IC, to passively align one or more optical components 145 of the lateral interface 140 with the one or more optical waveguides 120-1, 120-2 along at least one dimension. Some exemplary arrangements of the alignment features of the frame 125 are discussed in greater detail below with respect to FIGS. 4A and 4B.

Figure 2:
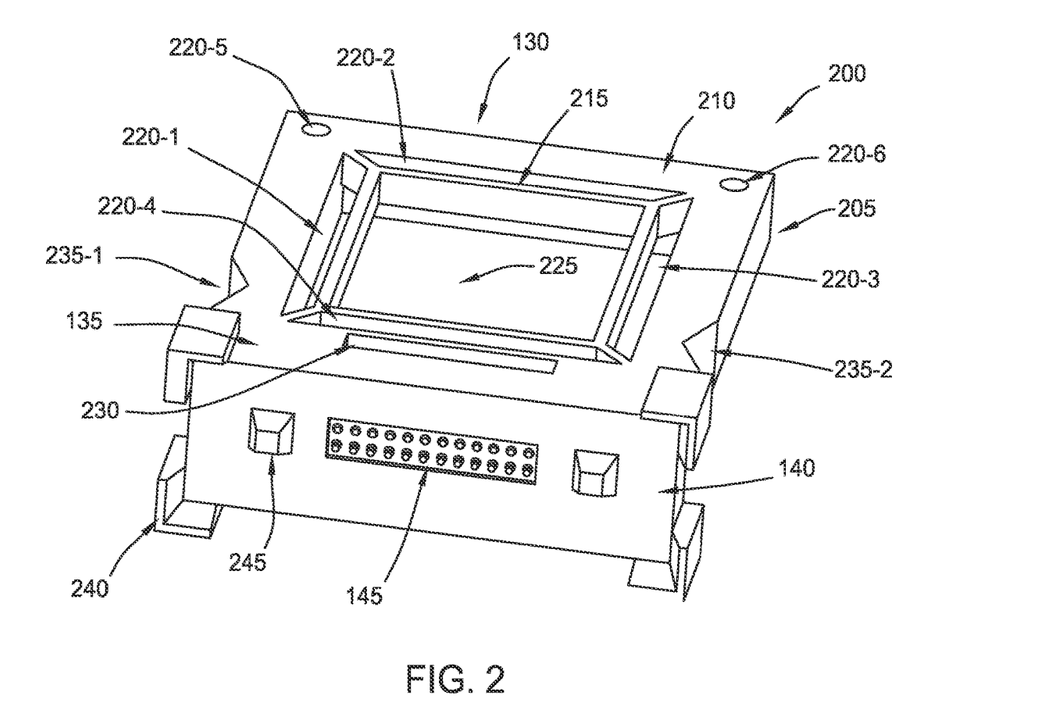
FIG. 2 is a perspective view of a frame for connecting an optical connector with a co-packaged optical device, according to one or more embodiments.

FIG. 2 is a perspective view of a frame 200 for connecting an optical connector with a co-packaged optical device. The features depicted in FIG. 2 may be used in conjunction with other embodiments. For example, the frame 200 represents one possible implementation of the frame 125 of FIG. 1.

The frame 200 comprises a frame body 205 in which the upper portion 130 and the lateral portion 135 are integrally formed. The frame body 205 defines an outer frame 210 connected with an inner frame 215. The outer frame 210 has a substantially solid structure (although openings may be formed therethrough), while the inner frame 215 has a frame structure.

The upper portion 130 defines a plurality of openings 220-1, ..., 220-6, 225, 230 extending therethrough. The opening 225 is centrally defined by the inner frame 215, and the openings 220-1, ..., 220-4 are defined between portions of the inner frame 215 and the outer frame 210. As shown, the opening 225 is substantially circumscribed by the openings 220-1, ..., 220-4. The opening 230 is arranged laterally outward of the opening 220-4. The openings 220-5, 220-6 are arranged near the opening 220-2 and extend through the outer frame 210.

The top surface of the upper IC (a photonic IC or another IC) is exposed through the openings 220-1, ..., 220-4, 225. In some embodiments, the openings 220-1, ..., 220-4 are adhesive openings into which adhesive is applied and cured to secure the frame body 205 to the top surface of the upper IC. The outer frame 210, the inner frame 215, and the openings 220-1, ..., 220-4 thus define an attachment interface that distributes a mating force of an optical connector across the top surface of the upper IC.

The opening 225 may be dimensioned to allow additional component(s) to be attached to the top surface of the upper IC. In some embodiments, the opening 225 is a thermal interface opening into which a heat sink or other thermal interface may be inserted and attached to the upper IC at the top surface.

The opening 230 is an adhesive opening through which an index-matching adhesive may be deposited into an optical path between the optical waveguide(s) of the photonic IC and the optical component(s) 145 of the interface 140. In some embodiments, the top surface of the upper IC and/or a top surface of a lower IC are exposed through the opening. Thus, the index-matching adhesive may attach the frame body 205 to the upper IC and/or the lower IC.

In some embodiments, the index-matching adhesive may be applied through the opening 230 (and cured) after passive and/or active alignment processes for optically aligning the optical component(s) 145 and the optical waveguide(s) of the photonic IC. In this way, the frame body 205 may be secured to the photonic IC in the optically-aligned arrangement. In some embodiments, the index-matching adhesive may also be applied through the openings 220-5, 220-6 to secure the frame body 205 to the photonic IC (and/or other ICs) at additional locations.

In some embodiments, a first, index-matching adhesive is applied through the openings 230, 220-5, 220-6 and UV-cured to provide a temporary attachment (e.g., a tack) of the frame body 205 to the photonic IC and/or other ICs. A second adhesive may be applied through the openings 220-1, ..., 220-4 and heat cured to provide a permanent attachment of the frame body 205 to the photonic IC (and/or other ICs). Subsequent heating processes, such as the heat curing of the second adhesive and/or SMT reflow solder processes, may cause the first adhesive to lose some or all of its mechanical rigidity. In this way, the heat curing causes the first adhesive to yield the mechanical attachment function while causing the second adhesive to assume the mechanical attachment function. Thus, a larger number of adhesives may be suitable for use as the first index-matching adhesive (e.g., silicones, epoxies), as mechanical rigidity is only temporarily needed.

The frame body 205 is dimensioned to arrange an optical connector (e.g., the optical connector 150 of FIG. 1) with a predetermined alignment at the interface 140. When in the predetermined alignment, the one or more optical components 145 align with optical fiber(s) attached to the optical connector.

In some embodiments, the interface 140 comprises alignment feature(s) that urge the optical connector 150 toward the predetermined alignment. As shown, the frame body 205 comprises guides 240 arranged around the interface 140, and surface features 245 extending from the plane of the interface 140. The guides 240 couple with peripheral surfaces of the optical connector, and the surface features 245 couple with corresponding features at the face of the optical connector. As shown, the guides 240 include chamfered edges, and the surface features 245 comprise trapezoidal features that are received by corresponding recessed features of the optical connector. However, other implementations may include different shapes (e.g., cones, funnels) and/or different orientations (e.g., the surface features 245 may be recessed into the lateral portion 135).

The frame body 205 comprises grooves 235-1, 235-2 defined on opposing sides of the outer frame 210. The grooves 235-1, 235-2 receive and retain one or more latching features that project from the optical connector, such as corresponding tabs. Other implementations may include other types of mechanical features, which may include features projecting from the frame body 205 that are received by corresponding portions of the optical connector.

FIGS. 3A-3D illustrate different arrangements of optical components at a lateral interface 140 of a frame. The features depicted in FIGS. 3A-3D may be used in conjunction with other embodiments.

Figure 3A:
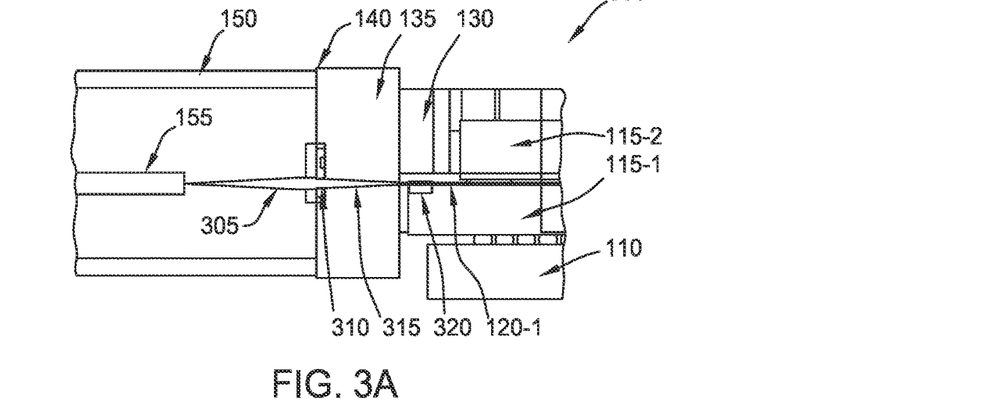
FIGS. 3A-3D illustrate different arrangements of optical components in a lateral interface of a frame, according to one or more embodiments.

In diagram 300, the upper portion 130 contacts the upper IC 115-2 and the one or more optical components at the interface 140 are optically aligned with the one or more optical waveguides of the photonic IC (here, the lower IC 115-1). As shown, a collimating lens 310 is optically aligned with the optical waveguide 120-1 through an edge coupler 320 in the photonic IC. In some embodiments, the edge coupler 320 comprises a multi-prong waveguide adapter (as described above; also referred to as a "multi-prong edge coupler"). Thus, when the optical waveguide 120-1 is operated by the photonic IC as a receiver channel, light 305 exiting the optical fiber 155 is propagated through the collimating lens 310, and collimated light 315 is received by the edge coupler 320. When the optical waveguide 120-1 is operated by the photonic IC as a transmitter channel, light 315 exits the edge coupler 320 and is propagated through the collimating lens 310. The collimated light 305 is received by the optical fiber 155.

Figure 3B:
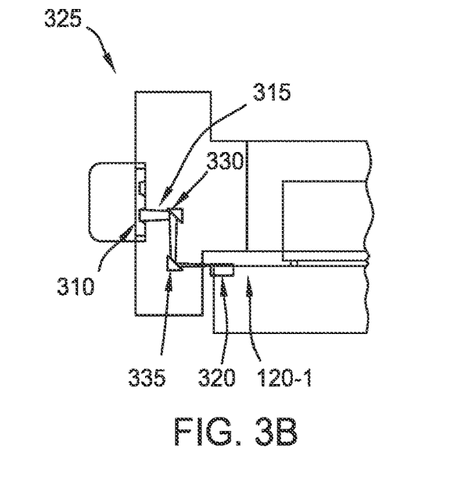

In diagram 325, while operating in a receiver configuration, a first mirror 330 redirects the light 315 from the collimating lens 310, and a second mirror 335 redirects the once-redirected light into the edge coupler 320. The process is generally reversed while operating in a transmitter configuration. In some embodiments, the first mirror 330 and the second mirror 335 each perform an orthogonal redirection of the light. In this way, the first mirror 330 and the second mirror 335 operate as a periscope that accommodates implementations having the optical waveguide 120-1 and the optical fiber at different heights. The first mirror 330 and/or the second mirror 335 may have any suitable shape, such as flat mirrors or parabolic mirrors. In some embodiments, the collimating lens 310 may be replaced by a parabolic mirror to provide a longer collimated beam.

Figure 3C:
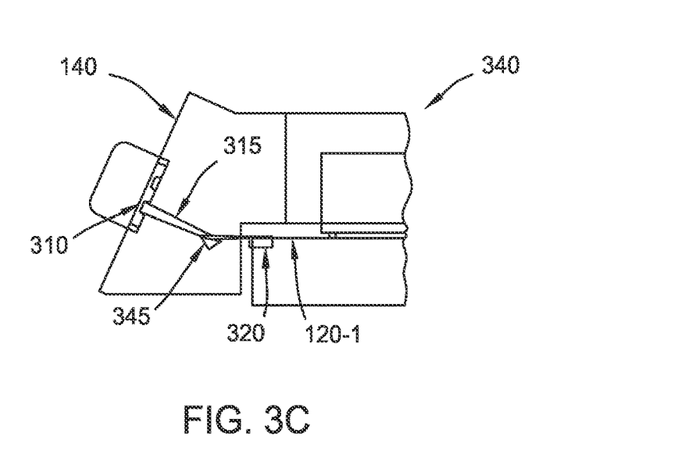

In diagram 340, the interface 140 and the collimating lens 310 are angled (i.e., a non-perpendicular orientation relative to a length of the optical waveguide 120-1). Describing a receiver configuration, a mirror 345 redirects the light 315 from the collimating lens 310. The process is generally reversed while operating in a transmitter configuration. The mirror 345 may have any suitable shape, such as a flat mirror or a parabolic mirror. In some embodiments, the collimating lens 310 may be replaced by a parabolic mirror to provide a longer collimated beam.

Figure 3D:
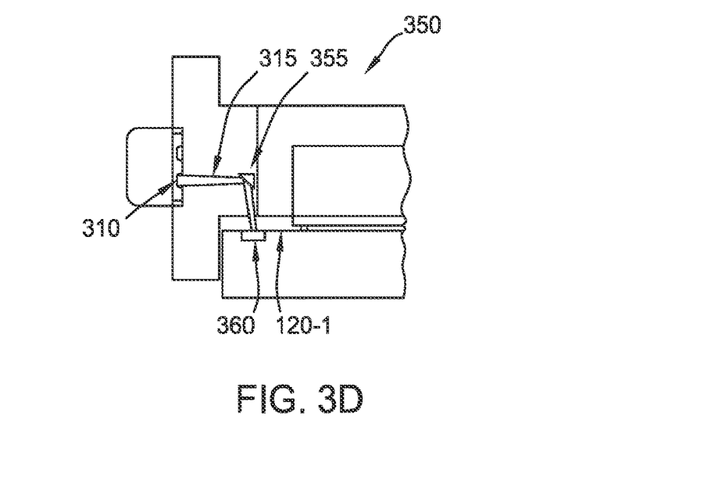

In diagram 350, while operating in a receiver configuration, a mirror 355 redirects the light 315 from the collimating lens 310 into a grating coupler 360 disposed at or near a top surface of the photonic IC. The process is generally reversed while operating in a transmitter configuration. The mirror 355 may have any suitable shape, such as a flat mirror or a parabolic mirror. In some embodiments, the collimating lens 310 may be replaced by a parabolic mirror to provide a longer collimated beam.

Figure 4A:
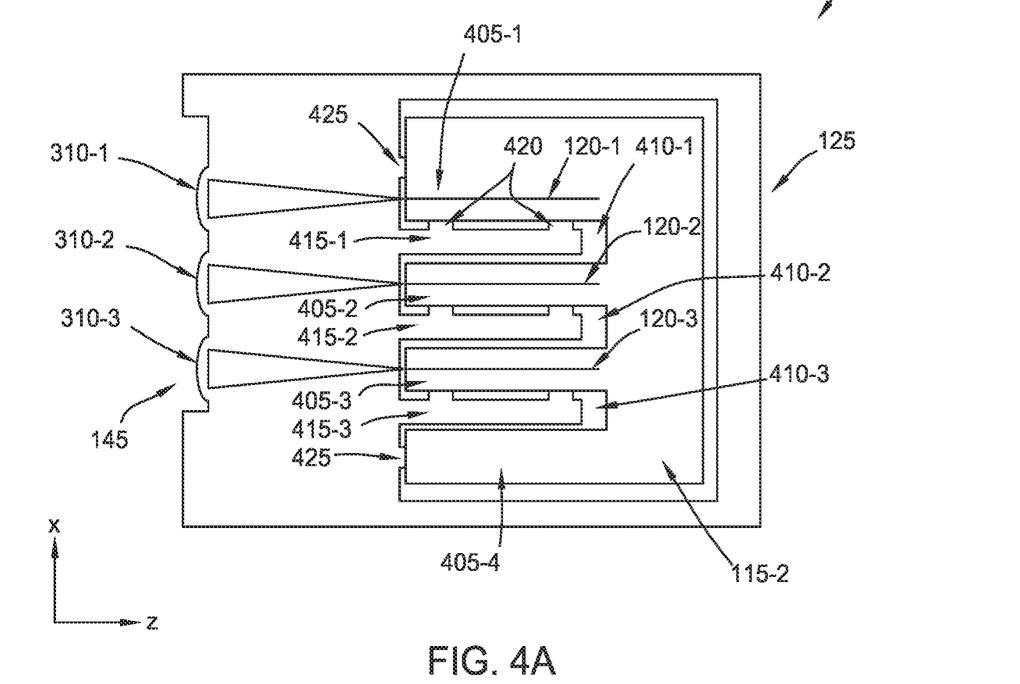
FIGS. 4A and 4B illustrate different arrangements of alignment features of a frame, according to one or more embodiments.
Figure 4B:
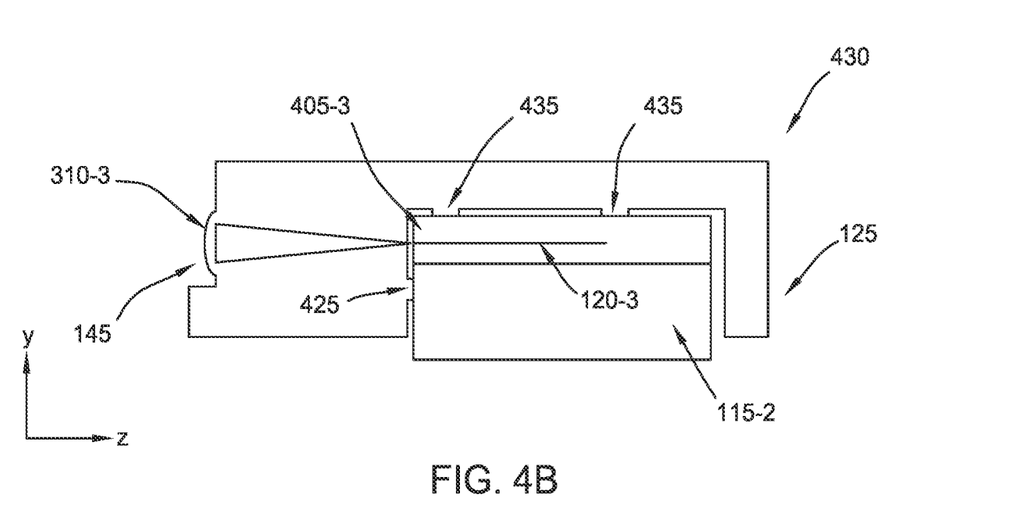

FIGS. 4A and 4B illustrate different arrangements of alignment features of the frame 125. The features depicted in FIGS. 4A and 4B may be used in conjunction with other embodiments. For example, contacting the alignment features of the frame 125 may align the one or more optical components 145 of the lateral interface with optical waveguides 120-1 of a photonic IC along at least one dimension.

The diagram 400 provides a top view of one implementation of the frame 125. In the diagram 400, the photonic IC (e.g., the upper IC 115-2) comprises a plurality of ridges 405-1, 405-2, 405-3, 405-4 that are spaced apart from each other. As shown, the ridges 405-1, 405-2 are separated by a groove 410-1, the ridges 405-2, 405-3 are separated by a groove 410-2, and the ridges 405-3, 405-4 are separated by a groove 410-3. In some embodiments, the depth of the grooves 410-1, 410-2, 410-3 extends fully through the photonic IC, such that a surface beneath the photonic IC is exposed. In other embodiments, the depth of the grooves 410-1, 410-2, 410-3 extends partly through the photonic IC. In some embodiments, beam collimation may be achieved by replacing the first mirror 330 or the second mirror 335 with a parabolic surface, as an alternate to beam collimation using the lens 310.

As shown, an optical waveguide 120-1 is arranged in the ridge 405-1, an optical waveguide 120-2 is arranged in the ridge 405-2, and an optical waveguide 120-3 is arranged in the ridge 405-3.

The frame 125 defines one or more alignment features that contact the photonic IC to passively align the optical components 145 with the optical waveguides 120-1, 120-2, 120-3 along at least one dimension. As shown, the optical components 145 comprise collimating lenses 310-1, 310-2, 310-3, although other arrangements of the optical components 145 are also contemplated (e.g., as depicted in FIGS. 3A-3D).

The frame 125 comprises a plurality of fingers 415-1, 415-2, 415-3 used to passively align the collimating lenses 310-1, 310-2, 310-3 with the optical waveguides 120-1, 120-2, 120-3 along the x-dimension. The plurality of fingers 415-1, 415-2, 415-3 are received into respective ones of the grooves 410-1, 410-2, 410-3. In some embodiments, each of the fingers 415-1, 415-2, 415-3 include lateral stand-offs 420 that contact lateral edges of the respective ridges 405-1, 405-2, 405-3. As shown, each of the fingers 415-1, 415-2, 415-3 include two (2) lateral stand-offs 420, although other numbers of lateral stand-offs are also contemplated. In other embodiments, the lateral stand-offs 420 may be omitted and lateral edges of the fingers 415-1, 415-2, 415-3 contact the lateral edges of the respective ridges 405-1, 405-2, 405-3.

The frame 125 further comprises depth stand-offs 425 that contact endface portions of the photonic IC. As shown, one of the depth stand-offs 425 contacts an endface of the ridge 405-1 at a location laterally outward of the optical waveguide 120-1, and the other of the depth stand-offs 425 contacts an endface of the ridge 405-4 (which does not include an optical waveguide). Although the frame 125 includes two (2) depth stand-offs 425, other numbers of depth stand-offs are also contemplated. In other embodiments, the depth stand-offs 425 may be omitted and edges of the frame 125 contact the endface portions of the photonic IC. In this way, the frame 125 may also passively align the collimating lenses 310-1, 310-2, 310-3 with the optical waveguides 120-1, 120-2, 120-3 along the z-dimension.

The diagram 430 provides a cross-section view of another implementation of the frame 125. In the diagram 400, the frame 125 comprises the depth stand-offs 425 to align the collimating lenses 310-1, 310-2, 310-3 with the optical waveguides 120-1, 120-2, 120-3 along the z-dimension. The frame 125 further comprises height stand-offs 435 that contact a top surface of the ridge 405-3.

Although the frame 125 includes two (2) height stand-offs 435, other numbers of height stand-offs are also contemplated. In other embodiments, the height stand-offs 435 may be omitted and a surface of the frame 125 contacts the top surface of the ridge 405-3 or other portions of the photonic IC. In this way, the frame 125 may also passively align the collimating lenses 310-1, 310-2, 310-3 with the optical waveguides 120-1, 120-2, 120-3 along the y-dimension.

Although FIGS. 4A and 4B each depict implementations of the frame 125 that passively align the collimating lenses 310-1, 310-2, 310-3 with the optical waveguides 120-1, 120-2, 120-3 along two dimensions, alternate implementations of the frame 125 may include alignment features that passively align along a different number of dimensions (e.g., one or three). Further, in some embodiments, active alignment may be performed in conjunction with the passive alignment to align the collimating lenses 310-1, 310-2, 310-3 with the optical waveguides 120-1, 120-2, 120-3 along one or more additional dimensions.

Figure 5A:
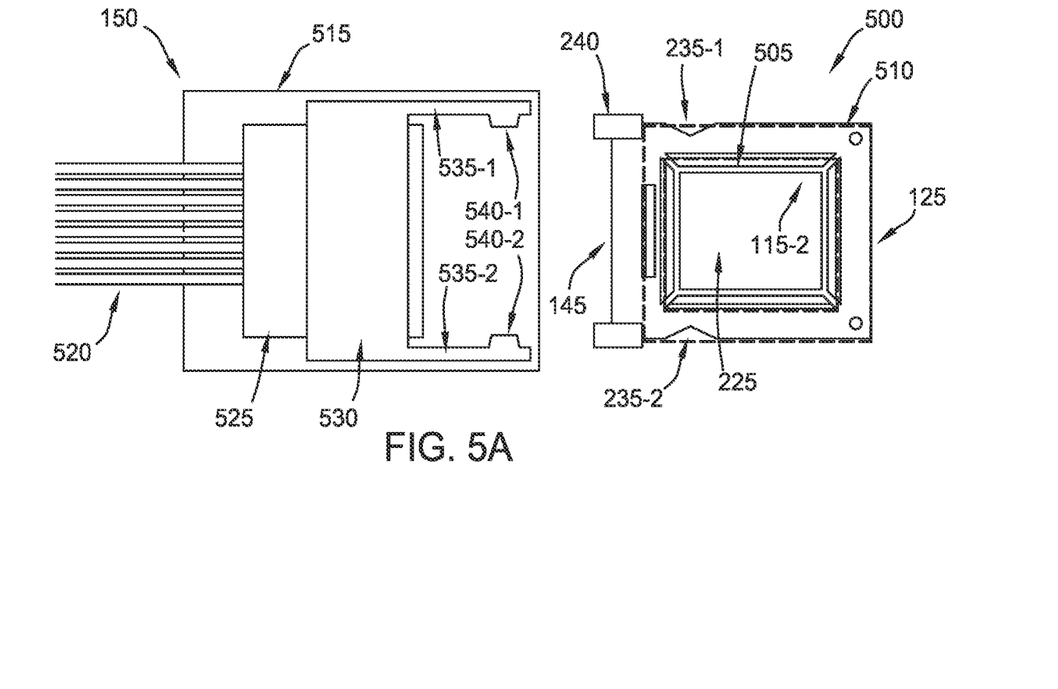
FIGS. 5A and 5B illustrate unmated and mated configurations of an optical connector with a frame, according to one or more embodiments.
Figure 5B:
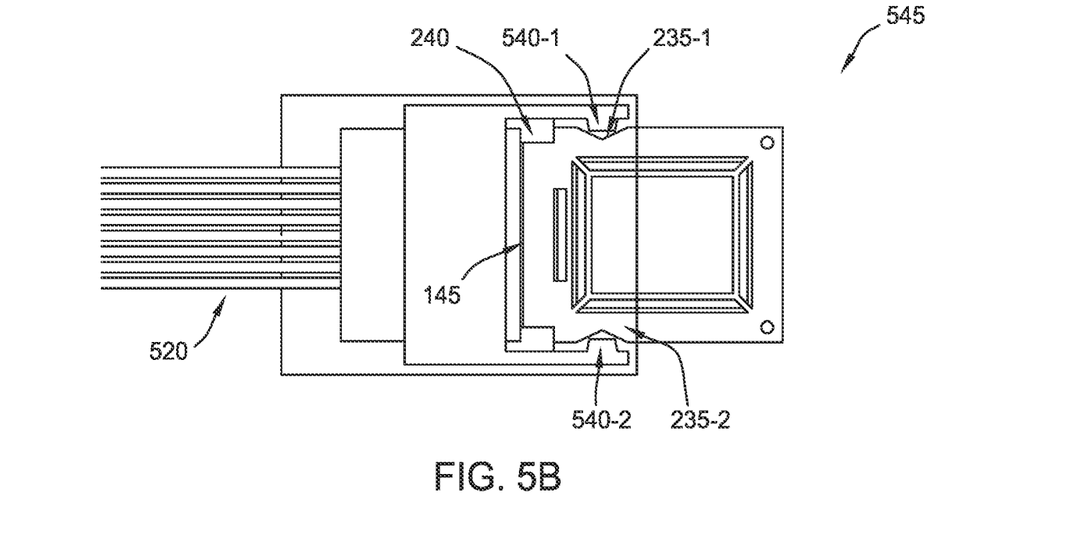

FIGS. 5A and 5B illustrate unmated and mated configurations of the optical connector 150 with the frame 125, according to one or more embodiments. The features illustrated in diagrams 500, 545 may be used in conjunction with other embodiments.

Diagram 500 is a top view of an unmated configuration of the optical connector 150 with the frame 125. An areal extent 510 of the upper portion of the frame 125 is greater than an areal extent 505 of the top surface of the upper IC 115-2. In this way, the frame 125 when adhered to the upper IC 115-2 is capable of distributing the mating force of the optical connector 150 across the top surface of the photonic IC (or other IC).

The optical connector 150 comprises a housing 515 into which a plurality of optical fibers 520 are inserted. The optical fibers 520 are attached to, and arranged by, a FAU 525 arranged within the housing 515. A latch member 530 is attached to the FAU 525 within the housing 515. The latch member 530 includes one or more latching features that mate with one or mechanical features of the frame 125 to retain the optical connector 150. As shown, the latch member 530 includes two (2) arms 535-1, 535-2 at opposing ends of the latch member 530. The arms 535-1, 535-2 include tabs 540-1, 540-2 that project inward and that are dimensioned to be received and retained by the grooves 235-1, 235-2 of the frame 125, which is shown in the mated configuration in the diagram 545.

In the mated configuration, the guides 240 are coupled with peripheral surfaces of the optical connector 150 (here, the FAU 525). In some cases, in the mated configuration one or more surface features on the lateral portion of the frame 125 are coupled with corresponding features at the face of the optical connector 150 (the FAU 525).

Figure 6:
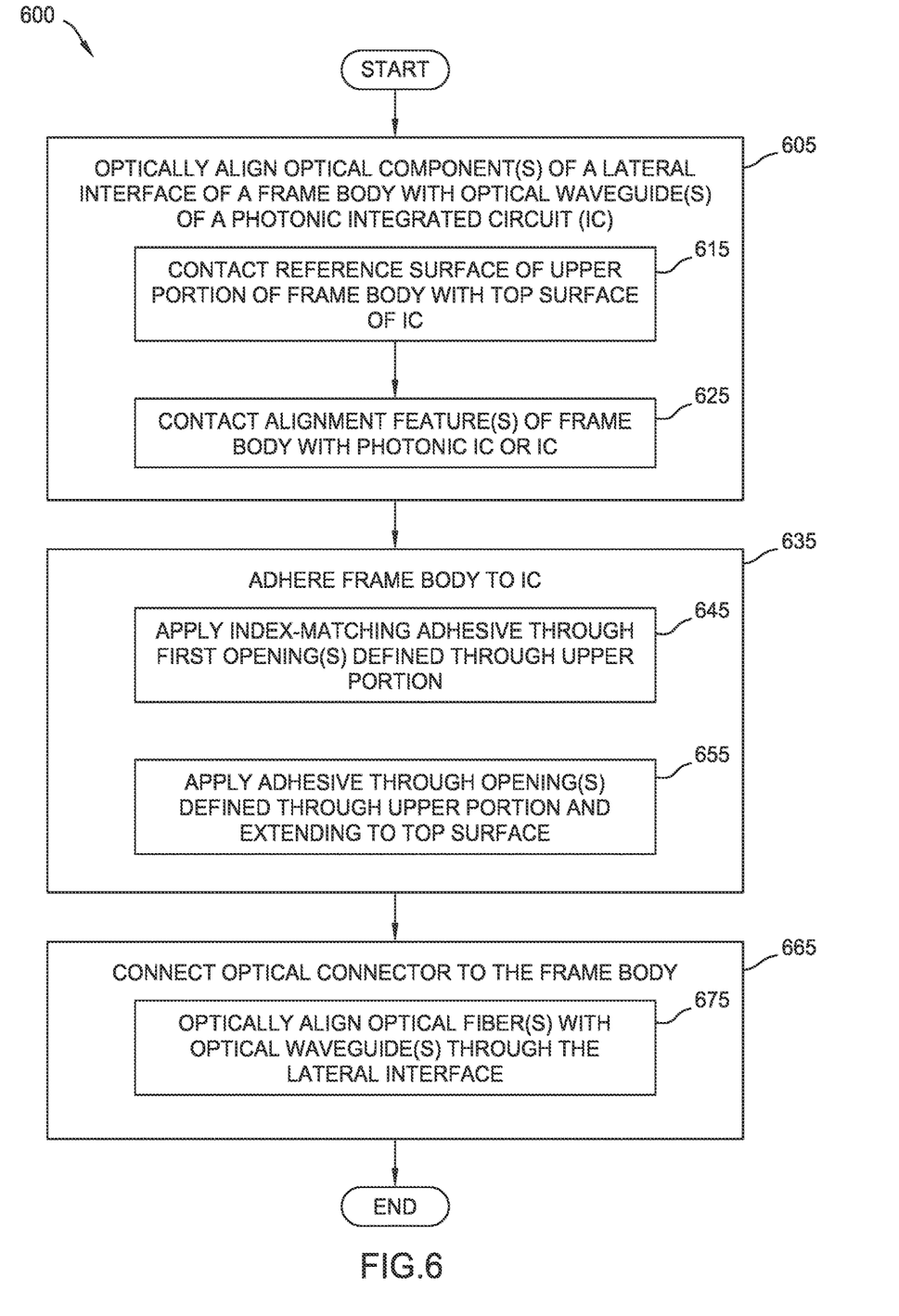
FIG. 6 is a method of fabricating an optical apparatus, according to one or more embodiments.

FIG. 6 is a method 600 of fabricating an optical apparatus, according to one or more embodiments. The method 600 may be used in conjunction with other embodiments, e.g., to fabricate the OE system 100 of FIG. 1.

The method 600 begins at block 605, where one or more optical components of a lateral interface of a frame body are optically aligned with one or more optical waveguides of a photonic IC. In some embodiments, the photonic IC is attached with one or more additional ICs, such as an electronic IC and/or a dummy IC. In some embodiments, the photonic IC is part of a preassembled OE package, which in some cases may be mounted to a PCB.

Optically aligning the optical component(s) with the optical waveguide(s) may include passive alignment and/or active alignment processes. In some embodiments, optically aligning the optical component(s) with the optical waveguide(s) comprises (at block 615) contacting a reference surface of an upper portion of the frame body with a top surface of an IC. In some embodiments, the IC is the photonic IC. In other embodiments, the IC is another IC (such as an electronic IC or a dummy IC) that is attached with the photonic IC. In some embodiments, optically aligning the optical component(s) with the optical waveguide(s) comprises (at block 625) contacting one or more alignment features of the frame body with the photonic IC or the other IC.

At block 635, the frame body is adhered to the IC. In some embodiments, adhering the frame body to the IC comprises (at block 645) applying an index-matching adhesive through one or more first openings defined through the upper portion of the frame body. In some embodiments, the index-matching adhesive is deposited into an optical path between the one or more optical waveguides of the photonic IC and the one or more optical components of the frame body. In some embodiments, the index-matching adhesive is UV-cured to provide a temporary attachment (e.g., a tack) of the frame body to the IC.

In some embodiments, adhering the frame body to the IC comprises (at block 655) applying a second adhesive through one or more openings defined through the upper portion of the frame body and extending to the top surface of the IC. In some embodiments, the second adhesive is heat cured to provide a permanent attachment of the frame body to the IC. The heat curing of the second adhesive may cause the index-matching adhesive to lose some or all of its mechanical rigidity. In this way, the heat curing causes the first adhesive to yield the mechanical attachment function while causing the second adhesive to assume the mechanical attachment function.

At block 665, an optical connector is connected to the frame body. In some embodiments, connecting the optical connector comprises (at block 675) optically aligning one or more optical fibers (attached to the optical connector) with the one or more optical waveguides through the lateral interface. In some embodiments, guides and/or surface features may be used to align the one or more optical fibers. In some embodiments, one or more latching features of the optical connector are retained by one or more mechanical features of the frame body. The method 600 ends following completion of block 675.

Figure 7A:
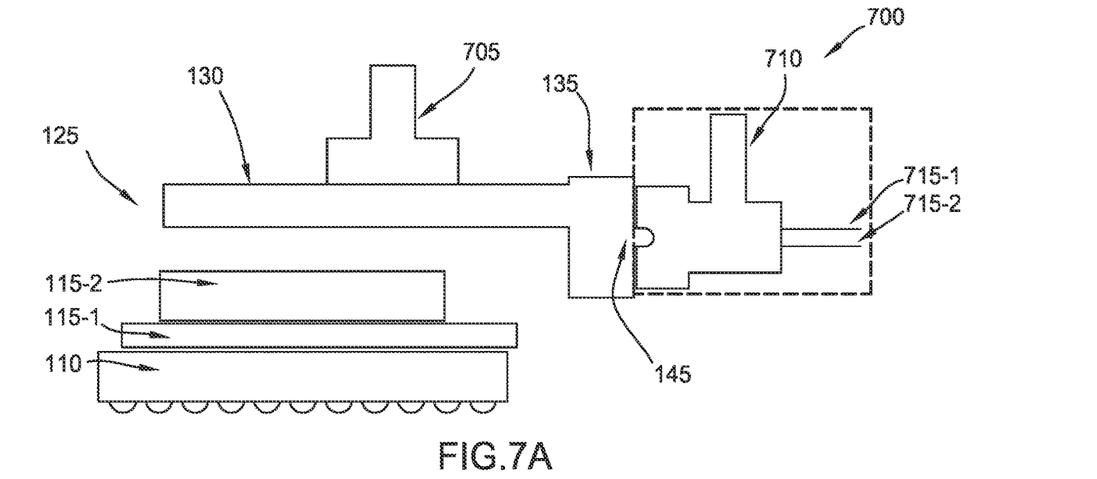
FIGS. 7A-7C illustrate a sequence of fabricating an optical apparatus, according to one or more embodiments.
Figure 7B:
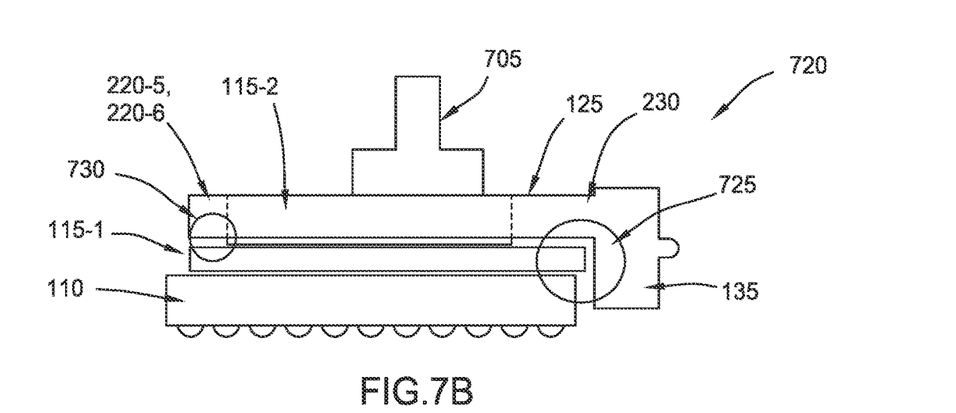
Figure 7C:
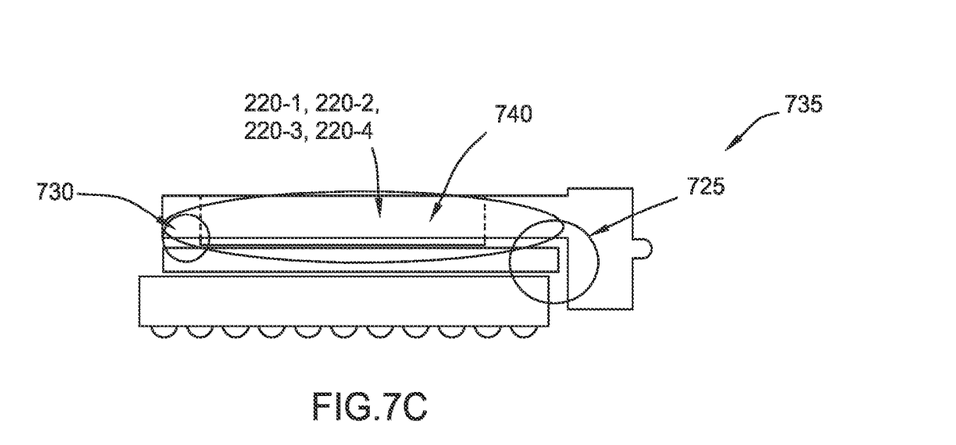

FIGS. 7A-7C illustrate a sequence of fabricating an optical apparatus, according to one or more embodiments. The features illustrated in diagrams 700, 720, 735 may be used in conjunction with other embodiments, e.g., to perform some or all of the method 600 of FIG. 6.

In diagram 700, a tool attaches to the frame 125 and moves the frame 125 toward the upper IC 115-2. In some embodiments, a tool 705 attaches to the upper portion 130 of the frame 125. In other embodiments, a tool 710 attaches to the lateral portion 135 of the frame 125.

Each of the tools 705, 710 may be further configured to align the frame 125 along one or more dimensions. In some embodiments, the tool 705 comprises a force sensor to detect a threshold resistance force (e.g., contacting alignment features) for performing passive alignment of the optical component(s) 145 of the frame 125 with optical waveguide(s) of the upper IC 115-2 or the lower IC 115-1. In some embodiments, the tool 710 is attached to one or more optical fibers 715-1, 715-2 for performing active alignment of the optical component(s) 145 of the frame 125 with optical waveguide(s) of the upper IC 115-2 or the lower IC 115-1.

In diagram 720, the tool 705 moves the frame 125 to contact the top surface of the upper IC 115-2. When the optical component(s) 145 are optically aligned with the optical waveguide(s), an index-matching adhesive 725 is applied through the opening 230, and an index-matching adhesive 730 is applied through the openings 220-5, 220-6. In some embodiments, the index-matching adhesive 725, 730 is UV-cured to temporarily attach the frame 125 to the upper IC 115-2 and/or the lower IC 115-1.

In diagram 735, a second adhesive 740 is applied through the openings 220-1, . . . , 220-4. In some embodiments, the second adhesive 740 is heat cured to permanently attach the frame 125 to the upper IC 115-2 and/or the lower IC 115-1. The optical component(s) 145 remain optically aligned with the optical waveguide(s) through the index-matching adhesive 725, despite any loss of mechanical rigidity of the index-matching adhesive 725 caused by the heat curing.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus supporting optical alignment with one or more optical waveguides optically exposed along an edge of a photonic integrated circuit (IC), the apparatus comprising:
   a frame body comprising:
      an upper portion defining a reference surface; and
      a lateral portion defining an interface for an optical connector connected with one or more optical fibers, wherein the lateral portion comprises one or more optical components defining an optical path through the lateral portion, wherein the one or more optical components are arranged relative to the reference surface such that the one or more optical components align with (i) the one or more optical waveguides along at least one dimension when the reference surface contacts a top surface of an anchor IC, and with (ii) the one or more optical fibers when the optical connector is connected at the interface.

2. The apparatus of claim 1, wherein an areal extent of the upper portion is greater than an areal extent of the top surface.

3. The apparatus of claim 1, wherein the one or more optical components comprise an array of collimator lenses at the interface.

4. The apparatus of claim 1, wherein the upper portion defines a plurality of openings extending through the upper portion and exposing the top surface.

5. The apparatus of claim 4, wherein the plurality of openings comprise one or more adhesive openings for securing the frame body to the top surface.

6. The apparatus of claim 5, wherein the one or more adhesive openings comprise a first adhesive opening through which an index-matching adhesive is deposited into an optical path between the one or more optical waveguides and the one or more optical components.

7. The apparatus of claim 5, wherein the plurality of openings further comprise a thermal interface opening.

8. The apparatus of claim 1, wherein the anchor IC is the photonic IC.

9. The apparatus of claim 1, wherein the anchor IC is an electronic IC, or a dummy IC, that is coupled with the photonic IC.

10. The apparatus of claim 1,
wherein the edge is a lateral edge of the photonic IC, and
wherein the one or more optical waveguides are optically exposed using one or more multi-prong edge couplers arranged at or near the lateral edge.

11. The apparatus of claim 1, wherein the frame body further comprises:
one or mechanical features configured to retain one or more latching features of the optical connector.

12. A method of fabricating an optical apparatus, the method comprising:
optically aligning one or more optical components of a lateral interface of a frame body with one or more optical waveguides of a photonic integrated circuit (IC), wherein the one or more optical waveguides are optically exposed along one or more lateral edges of the photonic IC, wherein the frame body further comprises an upper portion defining a reference surface, wherein optically aligning the one or more optical components comprises contacting the reference surface with a top surface of an integrated circuit (IC);
adhering the frame body to the IC, wherein adhering the frame body comprises applying an adhesive through one or more openings defined through the upper portion and extending to the top surface; and
connecting an optical connector to the frame body, wherein one or more optical fibers are connected to the optical connector, wherein connecting the optical connector optically aligns the one or more optical fibers with the one or more optical waveguides through the lateral interface.

13. The method of claim 12, wherein adhering the frame body to the IC further comprises:
applying, prior to applying the adhesive through the one or more openings, an index-matching adhesive through one or more other openings defined through the upper portion, wherein the index-matching adhesive is deposited into an optical path between the one or more optical waveguides and the one or more optical components.

14. The method of claim 13, wherein the index-matching adhesive provides a temporary attachment of the frame body to the IC, and wherein the adhesive provides a substantially permanent attachment of the frame body to the IC.

15. The method of claim 12, wherein the IC is the photonic IC.

16. The method of claim 12, wherein the IC is an electronic IC or a dummy IC that is coupled with the photonic IC.

17. An optical apparatus comprising:
an anchor integrated circuit (IC);
a photonic IC comprising one or more optical waveguides optically exposed along an edge of the photonic IC; and
a frame comprising:
a lateral interface configured to receive an optical connector, wherein one or more optical fibers attached to the optical connector are optically aligned with the one or more optical waveguides through the lateral interface; and
an attachment interface configured to distribute a mating force of the optical connector across a top surface of the anchor IC.

18. The optical apparatus of claim 17, wherein the anchor IC is the photonic IC.

19. The optical apparatus of claim 17, wherein the anchor IC is an electronic IC, or a dummy IC, that is coupled with the photonic IC.

20. The optical apparatus of claim 17, wherein the frame further comprises:
one or more alignment features configured to contact the anchor IC to passively align one or more optical components of the lateral interface with the one or more optical waveguides along at least one dimension.

* * * * *